United States Patent [19]

Brown

[11] Patent Number: 5,514,744
[45] Date of Patent: May 7, 1996

[54] CEMENT PRODUCTS AND A METHOD OF MANUFACTURE THEREOF

[75] Inventor: Jonathan L. Brown, Swindon, England

[73] Assignee: B & T Polymers Limited, Suffolk, England

[21] Appl. No.: 306,308

[22] Filed: Sep. 15, 1994

[30] Foreign Application Priority Data

Sep. 16, 1993 [GB] United Kingdom ............ 9319205

[51] Int. Cl.$^6$ .................... C08K 3/10; C08K 3/20
[52] U.S. Cl. .................... 524/423; 524/5; 524/437; 524/444
[58] Field of Search .............. 524/5, 423, 444, 524/437

[56] References Cited

U.S. PATENT DOCUMENTS

| 4,100,115 | 7/1978 | Baer | 521/83 |
|---|---|---|---|
| 4,174,230 | 11/1979 | Hashimoto et al. | 106/109 |
| 4,240,840 | 12/1980 | Downing et al. | 106/93 |
| 5,030,282 | 7/1991 | Matsuhashi et al. | 106/692 |
| 5,059,371 | 10/1991 | Saheki et al. | 264/108 |

FOREIGN PATENT DOCUMENTS

| 2135352 | 12/1972 | France . |
|---|---|---|
| 635486 | 4/1950 | United Kingdom . |
| 962826 | 7/1964 | United Kingdom . |
| WO86/04889 | 8/1986 | WIPO . |
| WO89/09196 | 10/1989 | WIPO . |

OTHER PUBLICATIONS

By M. Pulin et al., "Properties of mixtures of gypsum semihydrate with alumina cement", Chemical Abstracts, Jun. 1985, vol. 94, No. 24, 94:196566x.

By R. Miura et al., "Low-solubility acrylic monomer in-situ polymerization in concrete manufacture for high strength", Chemical Abstracts, May 1988, vol. 108, No. 18, 108:155492j.

By F. Wang et al., "Heat-insulating, fire-resistant composites, and their use", Chemical Abstracts, Aug. 1990, vol. 113, No. 6, 113:45420e.

Primary Examiner—Veronica P. Hoke
Assistant Examiner—John J. Guarriello
Attorney, Agent, or Firm—Young & Thompson

[57] ABSTRACT

A combined alumina, cement and gypsum product comprises 100 parts by weight of alumina cement, 10 to 100 parts by weight of an aqueous polymer precursor emulsion (Component A), and 15 to 600 parts by weight of a hemihydrate gypsum (Component B). Component A preferably comprises a thermosetting acrylic resin, and Component B is preferably an alpha-hemihydrate gypsum or an anhydrous or retarded plaster. Aggregates, reinforcing materials or other additives may be incorporated into the product. The product is preferably prepared by mixing together Component A and the alumina cement to form a precursor slurry, then mixing together the precursor slurry and Component B, and allowing the mixture to cure.

4 Claims, No Drawings

CEMENT PRODUCTS AND A METHOD OF MANUFACTURE THEREOF

This invention related to cement products, in particular cement products comprising a mixture of alumina cement and gypsum, and to a method of manufacture thereof.

It has previously been proposed to provide gypsum products the properties of which have been modified by the incorporation of one or more polymers. For example GB-A-1390360 discloses gypsum products which have been modified by the addition of various polymers. A disadvantage of such products containing polymer additives is that they are prone to weathering or ageing degradation. This degradation manifests itself as softening, water penetration, staining, yellowing, cracking, chalking blistering or flaking.

It has also previously been proposed to provide high alumina-based cementatious products which have been modified by incorporation of one or more polymers. For example, in European Patent No 0 021 682 there is disclosed a high alumina cement product modified by the addition of a polyvinyl alcohol/acetate, and a manufacturing method which prevents the formation of Ettringite and greatly enhances tensile and compressive strength by making Macro-Defect-Free (MDF) cements. This process involves heating the MDF cement paste to above 72° C. to prevent Ettringite formation whilst curing under an applied pressure of at least 5 MPa. The polyvinyl alcohol/acetate in this instance is used as a plasticiser and flowing agent.

The use of gypsum products to accelerate the curing time of alumina cements has long been known, though the maximum quantity of gypsum added has been limited to 25% by weight since otherwise excessive expansion occurs. Similarly, the use of alumina cements to enhance the strength of gypsum products has long been practised, but the maximum quantity of alumina cement added has been limited to 15% by weight, since addition of greater quantities again causes excessive expansion.

Using either alumina cements to strengthen gypsum products or gypsum products to accelerate the cure times of alumina cements impairs the fire resistance of both products. This is because of the formation of Ettringite. Ettringites are large monostable crystals that form within the layer lattice structure of both products. Ettringites dehydrate above 72° C., weakening the structural integrity of the product when exposed to any heat in excess of that temperature. It is also the formation of larger Ettringite crystals that causes the excessive expansion on mixing of alumina cement and gypsum.

It has been reported that low pH cement should be used in Glass Reinforced Concrete (GRC) to minimise alkali corrosion of the glass fibres ($CaO$—$Al_2O_3$—$SiO_2$ system) and that the $OH^-$ of cement hydration is the most important agent in attacking glass fibres. The corrosion of glass fibres is reduced to a minimum in the pH range 3.2 to 10.7.

It is an object of the present invention to provide an improved alumina cement and gypsum product, and a method of manufacturing such a product.

According to one aspect of the present invention, there is provided a combined alumina cement and gypsum product comprising 100 parts by weight of alumina cement, 10 to 100 parts by weight of an aqueous polymer precursor emulsion (Component A), and 15 to 600 parts by weight of a hemi-hydrate gypsum (Component B).

According to another aspect of the present invention, there is provided a method of producing a combined alumina cement and gypsum product, the method comprising the steps of:

(1) mixing together 10 to 100 parts by weight of an aqueous polymer precursor emulsion with 100 parts by weight of alumina cement to form a precursor slurry, (2) mixing together the precursor slurry and 15 to 600 parts by weight of hemi-hydrate gypsum, and (3) allowing the mixture to cure.

According to a further aspect of the present invention, there is provided a cured combined alumina cement and gypsum product prepared by the method defined in the last preceding paragraph.

The combined alumina cement and gypsum product of the present invention can be used to provide a water and weather resistant render that can be applied using traditional plastering methods or projection spraying.

Gypsum is particularly prone to water and weather erosion because of its layer lattice structure in which the calcium and sulphate ions together make up the individual layers which are linked by hydrogen bonds between the water molecules and the oxygen atoms of the sulphate ions. Exposure of the gypsum products to water causes the hydrogen bonding to break down with a consequential loss of structural integrity.

The combined alumina cement and gypsum product of the present invention is advantageous in that it exhibits greatly increased water resistance and strength.

It is thought that the use of polymer binder components in aqueous emulsion form is particularly advantageous because, during curing, the alumina cement and hemi-hydrated gypsum extract water from the emulsion and cause polymer films to form around the bridging water molecules in the combined alumina cement and gypsum lattice structure. This imparts the increased water resistance and strength.

Another advantage of the combined alumina cement and gypsum product of the present invention is that it can be reinforced using "E-glass" fibre reinforcement without the long term alkali degradation that occurs with cementatious products. If the pH of the aqueous polymer emulsion is between 3.0 and 4.0, it reduces the pH of the wet mix to within the optimum range of 3.2 to 10.7 allowing incorporation of standard glass fibre reinforcement without the long term alkali erosion that starts during the wet mix stage. The low pH of the emulsion also discourages the formation of Ettringite during cure and enables higher ratio additions of gypsum to alumina cement without destructive expansion.

The combined alumina cement and gypsum product of the present invention also exhibits reduced porosity. Gypsum products have a natural tendency to foam during cure. When gypsum products are added to alumina cements in high ratios they still foam and the subsequent formation of Ettringite causes destructive expansion in the gypsum products by causing interconnecting defects between gas entrapment voids. The use of an aqueous polymer emulsion in conjunction with the combined alumina cement and gypsum diminishes foaming and inhibits the formation of Ettringite, enhancing strength and fire resistance, without the need for further anti-foaming agents.

The small proportion of Ettringite that is formed enhances the overall strength of the material by applying expansive pressure against the contractive pressure of the polymer film formation along the layer lattice structure of the combined alumina cement and gypsum, minimising the formation of defects larger that 100 μm throughout the set material. This minimisation of large defects caused by large residual pores, air entrapment or packing defects leads to greatly enhanced strength in bending and tension. Unreinforced alumina cement and gypsum product of the present invention has a Young's Modulus of around 1485 MPa, which represents a significant increase over ordinary cement pastes. This increase is due to the minimisation of porosity to around 1%.

The aqueous polymer precursor emulsion (Component A) preferably comprises between 30% and 50% by weight of solids, preferably about 40% by weight. Preferably, Component A comprises a thermosetting resin such as a thermosetting acrylic resin. A preferred example is a mixture of acrylic monomers such as that supplied by Kemira Polymers under the product reference number Diorez 9769. These mixed acrylic monomers have a high molecular weight, typically around 500. Most preferably, the Component A emulsion has a viscosity (Brookfield) of 30–50 mPa.s (Spindle 2–30 rpm), a particle size of less that 1 μm and a pH value of between 3.0 and 5.0. The preferred Tg of the emulsion is between 24° and 26° C. with a stabilising anionic charge. Component A improves the water resistance of the final product by preventing water entering the pores of the structure. Excess water in the mix being subjected to curing or setting allows the small particle size acrylic component to migrate to the outer surface, thereby sealing the product against ingress of moisture. Component A also imparts high resistance to UV and IR radiation.

The polymer binder may also include a plasticizer to enhance workability. The preferred plasticizer is a melamine formaldehyde polymer, preferably present at from 1 to 10 parts by solid content weight. The melamine formaldehyde polymer is preferably added as a powder to the cementatious slurry. A suitable example is product Number BL434 from BIP Chemicals Limited. The melamine formaldehyde polymer has a tendency to migrate during cure to the centre of the mixture as the product therein cures, thus serving to reinforce and strengthen the main bulk of the product. The melamine formaldehyde polymer is fully compatible with, and will cross-link to, the acrylic materials preferably used in Component A.

Component B may be a hemi-hydrated gypsum powder ($CaSO_4 \cdot 5H_2O$) of any type. However, the preferred gypsum is either an alpha-hemi-hydrate such as "Extradur" from Lafarge Plasterboard or an anhydrous or retarded plaster such as "Universal Finish" from British Gypsum Limited. Beta-hemi-hydrated plasters tend to have a larger particle size and these particles can clump together, leaving voids between them that can weaken the homogeneity of the final mix.

The recommended alumina cement is "Ciment Fondue" from Lafarge Special Cements Limited or the Secar range, again from Lafarge Special Cements Limited. The choice depends upon the final colour and strength requirements. "Ciment Fondue" is nearly black in colour and contains less Alumina than the Secar range. Secar 51 is dark grey and has a lower alumina content than Secar 71, which is light grey. The higher the alumina content the greater the quantity of stable hydroalumina gel $Al(OH)_3$ that coexists with the surplus $CaSO_4$ in the solid phase.

Preferably, the product of the invention comprises 10 to 60 parts by weight of Component A, and 15 to 300 parts by weight of Component B, per 100 parts by weight of alumina cement.

It is preferred for the weight ratio of the alumina cement to hemi-hydrated gypsum to be in the range 1:6 to 4:1 with the range 1:3 to 4:1, and in particular the ratio 1:1, being preferred. The weight ratio of alumina cement to Component A is preferably in the range 1:1 to 8:1, with the range 1.67:1 to 8:1, and in particular the ratio 2:1 being preferred. The weight ratio of alumina cement to melamine formaldehyde resin is preferably in the range 5:1 to 20:1, more preferably 10:1. Additional water may be added provided that the total weight of water, including the water content of Component A, per hundred parts by weight of alumina cement and gypsum combined, does not exceed about 40 parts.

The first stage in the drying of the emulsion film involves the extraction of water, in part, from the hydrolysation of the alumina cement and hemi-hydrated gypsum, with the remainder by residual evaporation. On any exposed surface of the material a skin will form through oxidative absorption and evaporation of surface water. The internal water extraction and residual evaporation is triggered by the exothermic hydrolysation of the mineral binders which raises the core materials temperature by around 29° C. This exothermic reaction drives off excess water, diluting Component A towards the outer surfaces, controlling and slowing the film formation until after the hydrolysation process has taken place. At the surface and underneath the initial skinning, fully oxidative cross-linking film formation takes place between the remaining polymer resins, controlled by the slow evaporation of excess water, and forming a homogeneous whole.

The mix and therefore resultant alumina cement and gypsum product may further contain a sodium citrate solution to retard the cure of the mix. The solution may be made by dissolving sodium citrate granules (e.g. from ADM, Ringaskiddy, Cork, Ireland) in the weight ratio of 1 part sodium citrate to 10 parts water and may be added in a weight ratio range of alumina cement to sodium citrate solution of from 50:1 to 200:1.

The mix may further include aggregates and/or natural or synthetic pigments and/or stainers to impart a range of different properties, finishes and/or colours to the resultant products. For example, Alag from Lafarge Special Cements Limited or Litag from Boral Litag Limited can be added in the weight ratio of up to 5 parts to 1 part alumina cement. This will provide an extremely high compressive strength together with very high surface abrasion resistance, particularly as there is a chemical bond between the mix and the Alag or Litag aggregate.

The mix may further include standard glass fibre reinforcement in the form of chopped strand, random mat, woven and non-woven fabrics to make a material with much improved performance compared with Glass Reinforced Concrete (GRC).

The mix may further include other reinforcing materials such as carbon fibres, aramids, polyethylene fibres, polypropylene fibres, polyester fibres, natural fibres, nylon and reinforcing fabrics, including fabrics pre-impregnated with thermosetting resins.

The present invention will now be described in greater detail, by way of illustration only, in the following examples:

EXAMPLE 1

A mix is produced by blending together, using a high shear mixer such as a paint stirrer attached to an electric drill, 50 parts by weight of the acrylic emulsion known as Diorez 9769 (Kemira Polymers) with 100 parts of the alumina cement Secar 71 (Lafarge Special Cements Limited). Once thoroughly mixed, 10 parts by weight of melamine formaldehyde resin (BL434 manufactured by BIP Chemicals Limited) was added and stirred in using the high shear mixer. To the resultant mix was added 100 parts by weight of the hemi-hydrated gypsum sold under the brand name "Extrudur" by Lafarge Plasterboard Limited. This was stirred in again using the high shear mixer until a homogeneous mix without lumps was achieved before being poured into a suitable mould.

For this example an appropriate test block in the form of a rectangular panel was made. Within 90 minutes the mix had cured sufficiently and the panel was demouldable and handleable.

After fourteen days the panel was tested and showed a compressive strength of 49.91 MPa, a Young's Modulus of 1485 MPa and a percentage strain at yield of 3.766%.

Another panel was weighed and then immersed in water for 24 hours, after which time it was weighed again. The weight increase was less than 1%.

EXAMPLE 2

A mix was produced by blending together, using a plasterer's whisk, 50 parts by weight of the acrylic emulsion Diorez 9769 (Kemira Polymers) with 100 parts of the alumina cement Secar 71 (Lafarge Special Cements Limited), 4 parts by weight of titanium dioxide and 2 parts by weight of a titanium dioxide based stainer, both supplied by Kemira Coatings Limited. Once thoroughly mixed, 100 parts by weight of the hemi-hydrated gypsum sold under the brand name "Universal Finish" by British Gypsum Ltd was added. This was thoroughly stirred in, using the plasterer's whisk before adding 20 parts by weight of melamine formaldehyde (BL 434 from BIP Chemicals Limited). Using conventional plastering techniques and tools the resultant mix was applied to an exterior wall to a depth of 10 mm.

This exterior wall was subjected to harsh climatic conditions, including temperature extremes of 0° and 46° C., humidity up to 90% RH, high rainfall, direct sunlight in desert conditions, sand scouring and high salt levels. After a year no cracking or crazing was observed and the finish remained brilliant white.

EXAMPLE 3

A mix was produced by blending together, using a plasterer's whisk, 50 parts by weight of the acrylic emulsion Diorez 9769 (Kemira Polymers) with 100 parts of the alumina cement Secar 71 (Lafarge Special Cements Limited). Once thoroughly mixed, 100 parts by weight of the hemi-hydrated gypsum sold under the brand name "Universal Finish" by British Gypsum Limited was added. This was thoroughly stirred in, using the plasterer's whisk.

Using conventional plastering techniques and tools, the resultant mix was applied to the interior face 3 meters by 2 meters of a standard cavity brick wall to a depth of 4 mm. A glass fibre matting (Cotech EQX-1168, style 3076, from Tech Textiles Limited) was trowelled in, in a vertical direction. The fabric matting was butt jointed much like wallpaper. A second layer of the mix was then applied to the matting before a second layer of matting was applied in a horizontal direction. This process was continued until four layers had been applied, and a thin (1.5mm) skim surface coat of the mix was applied and polished to achieve a pleasing finish.

The wall was then subjected to an external explosion. The interior showed no spalling or cracking and the pressure wave was contained.

EXAMPLE 4

A mix was produced by blending together, using a high shear mixer such as a paint stirrer attached to an electric drill, 50 parts by weight of the acrylic emulsion Diorez 9769 (Kemira Polymers) with 100 parts of the alumina cement Secar 71 (Lafarge Special Cements Limited). To the resultant mix was added 100 parts be weight of the hemi-hydrated gypsum sold by Lafarge Plasterboard Limited under the brand name "Extrudur". This was stirred in again using the high shear mixer until a homogeneous mix without lumps was achieved before 200 parts of "Litag" (Boral Litag Limited) was added and then poured into a suitable mould to a depth of 35mm and vibrated. Six layers of Cotech Fabric EQX-1168, style 3076, from Tech Textiles Limited was hand laminated using a standard mix without any aggregate addition.

For this example an appropriate test block in the form of a square panel measuring 420×420×50 mm was made. Within 90 minutes the mix had cured sufficiently and the panel was demouldable and handleable. After four days the panel was taken to a firing range where two standard NATO 7.62 ball rounds were fired at the panel from a range of 10 meters. A third round, again 7.62 but armour piercing, was fired at the panel. None of the bullets penetrated the back of the panel. All bullets were within a 100 mm triangle. The weapon used was a standard SLR.

EXAMPLE 5

A cylindrical, open topped bin measuring 820 mm high and 580 mm diameter was made in three pieces—an inner core, winding and outer. The inner core was made using 50 parts by weight of Diorez 9769, 100 parts by weight of Secar 71 and 100 parts by weight of "Extrudur" gypsum plaster. Once a suitably homogeneous mix was achieved, 20 parts by weight of a chopped strand "E-glass" fibre 12 mm long was stirred in. The resultant mix was poured into a mould and vibrated to remove any entrapped air. After the mix had set—about 90 minutes later—the cast inner core was demoulded.

The inner core was then placed upon a mandrel winding machine where Cotech fabric EQX-2336 was passed through a trough containing a slurry mix. The slurry mix comprised 50 parts by weight of Diorez 9769, 100 parts by weight of Secar 71, 100 parts by weight of "Extrudur" gypsum plaster and 100 parts by weight of clean water. Four complete windings of fabric impregnated with the mix were laminated around the inner core. Excess fabric was cut and wrapped around the base of the inner core.

After the inner core and winding had dried completely they were placed inside a suitable outer mould. A standard mix comprising 50 parts by weight of Diorez 9769, 100 parts by weight of Secar 71 alumina cement and 100 parts by weight of "Extrudur" gypsum plaster was then poured into the mould, completely encasing the winding and base of the container. This was then vibrated and allowed to cure completely.

Fourteen days later the bins were explosively tested. The explosive charge weights ranged from 4ozs of Pe4 to 24ozs Pe4 with one explosive charge per bin. Each explosive charge contained items customarily found in terrorist devices such as batteries, timers etc. All bins contained the sideways blast and fragmentation without spalling and directed the residual blast upwards.

What is claimed is:

1. A method of producing a combined alumina cement and gypsum product containing hemihydrate gypsum and alumina cement in proportions of 15 to 600 parts by weight of hemi-hydrate gypsum to 100 parts by weight of alumina cement, the method comprising the steps of:

(1) mixing together 10 to 100 parts by weight of an aqueous polymer precursor emulsion having a pH of 3.0 to 5.0, with 100 parts by weight of alumina cement to form a precursor slurry, (2) mixing together the precursor slurry and 15 to 600 parts by weight of hemi-hydrate gypsum, and (3) allowing the mixture to cure.

2. A method as claimed in claim 1, wherein said aqueous polymer precursor emulsion has a particle size of less than 1 µm.

3. A method as claimed in claim 1, wherein the pH of said aqueous polymer precursor emulsion is between 3.0 and 4.0.

4. A combined alumina cement and gypsum product produced by the method of claim 1.

* * * * *